(12) United States Patent
Heffington

(10) Patent No.: US 8,503,656 B2
(45) Date of Patent: *Aug. 6, 2013

(54) SYSTEM AND METHOD FOR DETERMINING A TELECOMMUNICATIONS ADDRESS

(75) Inventor: Sidney Heffington, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,768

(22) Filed: Sep. 6, 2012

(65) Prior Publication Data

US 2012/0329436 A1 Dec. 27, 2012

Related U.S. Application Data

(63) Continuation of application No. 12/006,295, filed on Jan. 20, 2008, now Pat. No. 8,284,914.

(51) Int. Cl.
*H04M 3/42* (2006.01)
*H04M 15/06* (2006.01)
*H04M 17/00* (2006.01)

(52) U.S. Cl.
USPC ............. 379/207.12; 379/142.1; 379/201.01; 455/414.1

(58) Field of Classification Search
USPC ............... 379/142.1, 201.01, 221.01, 265.01, 379/207.12; 455/414.1, 457

See application file for complete search history.

(56) References Cited

U.S. PATENT DOCUMENTS

| | | | | |
|---|---|---|---|---|
| 4,757,267 A | * | 7/1988 | Riskin | 379/114.24 |
| 5,533,107 A | * | 7/1996 | Irwin et al. | 379/201.01 |
| 5,878,126 A | * | 3/1999 | Velamuri et al. | 379/219 |
| 6,690,664 B1 | * | 2/2004 | Khuc et al. | 370/352 |
| 6,999,777 B1 | * | 2/2006 | Ganesh | 455/456.1 |
| 7,139,820 B1 | * | 11/2006 | O'Toole et al. | 709/223 |
| 2002/0000999 A1 | * | 1/2002 | McCarty et al. | 345/764 |
| 2003/0222819 A1 | * | 12/2003 | Karr et al. | 342/457 |
| 2005/0190901 A1 | * | 9/2005 | Oborn et al. | 379/114.02 |
| 2005/0220288 A1 | * | 10/2005 | Huey | 379/265.02 |
| 2006/0020468 A1 | * | 1/2006 | Hilliard | 704/270 |
| 2006/0034267 A1 | * | 2/2006 | Torrey et al. | 370/360 |
| 2007/0281703 A1 | * | 12/2007 | Shkedi | 455/445 |

* cited by examiner

*Primary Examiner* — Khai N Nguyen
(74) *Attorney, Agent, or Firm* — Wolff & Samson, PC

(57) ABSTRACT

Disclosed is a method and system for determining a telecommunications address of a location. A telephone call from a caller located at the location is received. Location data associated with the received telephone call is then obtained. The telecommunications address can then be determined from the location data.

20 Claims, 5 Drawing Sheets

FIG. 2

| DATE | TIME | CALLER NUMBER | CALL** TYPE | CAPTURED LOCATION DATA |
|---|---|---|---|---|
| 11-03-07 | 11:07:24 AM ET | 615-555-0101 | CELL | 34.23456 AND 24.12345 |
| 11-03-07 | 11:07:56 AM ET | 615-555-3712 | LANDLINE | 392 EAST MAIN STREET SW ANY TOWN, TN 372XX |
| 11-03-07 | 11:08:16 AM ET | 713-555-8729 | LANDLINE | 1103 HWY 70 N SOMEWHERE, NC 245XX |
| 11-03-07 | 11:09:31 AM ET | 704-555-1111 | CELL | 35.11267 AND 25.23488 |
| 11-03-07 | 11:09:45 AM ET | 312-555-9095 | CELL | 39.70289 AND 29.21349 |
| 11-03-07 | 11:10:20 AM ET | 404-555-7446 | CELL | 31.36888 AND 21.22435 |

FIG. 3

| SEL | STREET ADDRESS STREET, CITY, STATE, ZIP | CLLI® 11 CHARACTER ALPHANUMERIC | V AND H COORDINATES (GPS) |
|---|---|---|---|
| — | 392 EAST MAIN STREET SW ANY TOWN, TN 372XX | ABCDEFTN11X | 34.23456 AND 24.12345 |
| — | 393 EAST MAIN STREET SW ANY TOWN, TN 372XX | ABCDJJTNYYY | 34.23458 AND 24.12355 |
| — | 394 EAST MAIN STREET SW ANY TOWN, TN 372XX | ABCDKKTNZZZ | 34.23460 AND 24.12361 |

SYSTEM AND METHOD FOR DETERMINING A TELECOMMUNICATIONS ADDRESS

This application is a continuation of U.S. patent application Ser. No. 12/006,295, filed Jan. 2, 2008, which is entirely incorporated herein by reference.

BACKGROUND OF THE INVENTION

The present invention is generally directed to telecommunication services and more particularly to determining a telecommunications address associated with a caller's location.

As used herein, an End User is a customer placing an order for telecommunications services. A telecommunications provider is a company providing service from a location associated with an End User to a network service location. An Access Provider is a company providing connectivity from the location of the End User to the Telecommunications Provider's network edge location.

When an End User places a new customer order with a representative of a telecommunications provider for new services (e.g., data services or telephone services), the End User typically provides the representative with the mailing or postal address at which the End User would like telecommunication services to be provided. This address, however, may differ from the address stored by the Access Provider. Specifically, each Access Provider maintains a database storing telecommunications addresses for the different locations they serve.

These telecommunications addresses may differ from the mailing or postal address associated with a location. For example, a postal address associated with a location may be "XYZ West Mt. Lexington Avenue, ABC City, LRP State, 12345" while a telecommunications address stored in a database for the location may be "XYZ Mt. Lexington Avenue West, ABC City, LRP State, 12345" or even "XYZ West Mount Lexington Avenue, ABC City, LRP State, 12345."

End User mailing addresses may also be vanity addresses such as 1 Commerce Square which is valid for mailing purposes. The Access Provider may have a telecommunications address in their database of 392 Main Street for that vanity address. The End User may also have a building location that is on a street corner and, as a result, has two street addresses.

These slight differences (in the above examples, the "Mt." to "Mount" and the location of "West") or use of vanity or corner addresses often result in errors in the providing of new services to the location. In particular, a representative of the Telecommunications Provider must submit an order to the Access Provider that includes the correct telecommunications address. The Telecommunications Provider representative queries the Access Provider database attempting to verify the End Users mailing address. A query for a particular mailing address, however, typically must match the address stored in the Access Provider database (i.e., the telecommunications address) exactly. If an exact match does not occur, then the database may indicate that the address being searched for does not exist in the database. The database may also provide addresses that are similar to the mailing address being queried, but these addresses may be far from the queried address (e.g., same street but a different town).

The representative of the Telecommunications Provider may have to guess which telecommunications address to provide services to or may have to contact the End User again to ask additional questions as to the customers location. The representative may then have to perform one or more additional queries to the Access Provider database in an attempt to locate the correct telecommunications address associated with the customers location.

This querying of the database may waste a significant amount of time and could result in delay in providing the services. This often results in an unhappy customer. For example, if the Telecommunications Provider representative selects one of the telecommunications addresses provided by the database in response to a query for a particular postal address, the customer may be unhappy if the Access Provider designs the service and sends installation people out to the incorrect location. If the selected address is incorrect, the customer may be unhappy because his service will be delayed, and a second party may be unhappy if the service provider comes to the second party's address to install service.

Therefore, there remains a need for an improved technique for determining a telecommunications address as stored by an Access Provider.

BRIEF SUMMARY OF THE INVENTION

The present invention provides an improved technique for determining a telecommunications address associated with a location. An End User places a request for service with a Telecommunications Provider. The End User then places a call from the location at which service is needed. Location data and related data are received from the telephone call and stored in a telecommunications provider database. This data is then used to determine the telecommunications address.

Determining the telecommunications address can include receiving the telecommunications address after querying an Access Provider database with the location data. In one embodiment, the telecommunications address includes a Common Language Location Identifier Code (CLLI® code), a street address, and/or vertical and horizontal (V&H) coordinates. The street address may be the same as or different than a mailing or postal address associated with the location.

The location data may include a variety of data. For example, the location data may include vertical and horizontal coordinates associated with the location. The location data may be coordinates generated by a global positioning system (GPS). Further, the related data can include the phone number of the caller, the date that the telephone call was placed, and the time that the telephone call was placed.

Once the telecommunications address is received, the telecommunication services can then be provided to the location. In one embodiment, the telecommunications address is displayed to a customer. The customer may include, for example, an employer of the caller, a parent of the caller, a guardian of the caller, and a business.

These and other advantages of the invention will be apparent to those of ordinary skill in the art by reference to the following detailed description and the accompanying drawings.

BRIEF DESCRIPTION OF THE DRAWINGS

FIG. 2 shows a data structure which may be used to store location data in a telecommunications provider database;

FIG. 3 shows a data structure which may be used to store telecommunication addresses in an Access Provider database;

DETAILED DESCRIPTION

Figure 1:
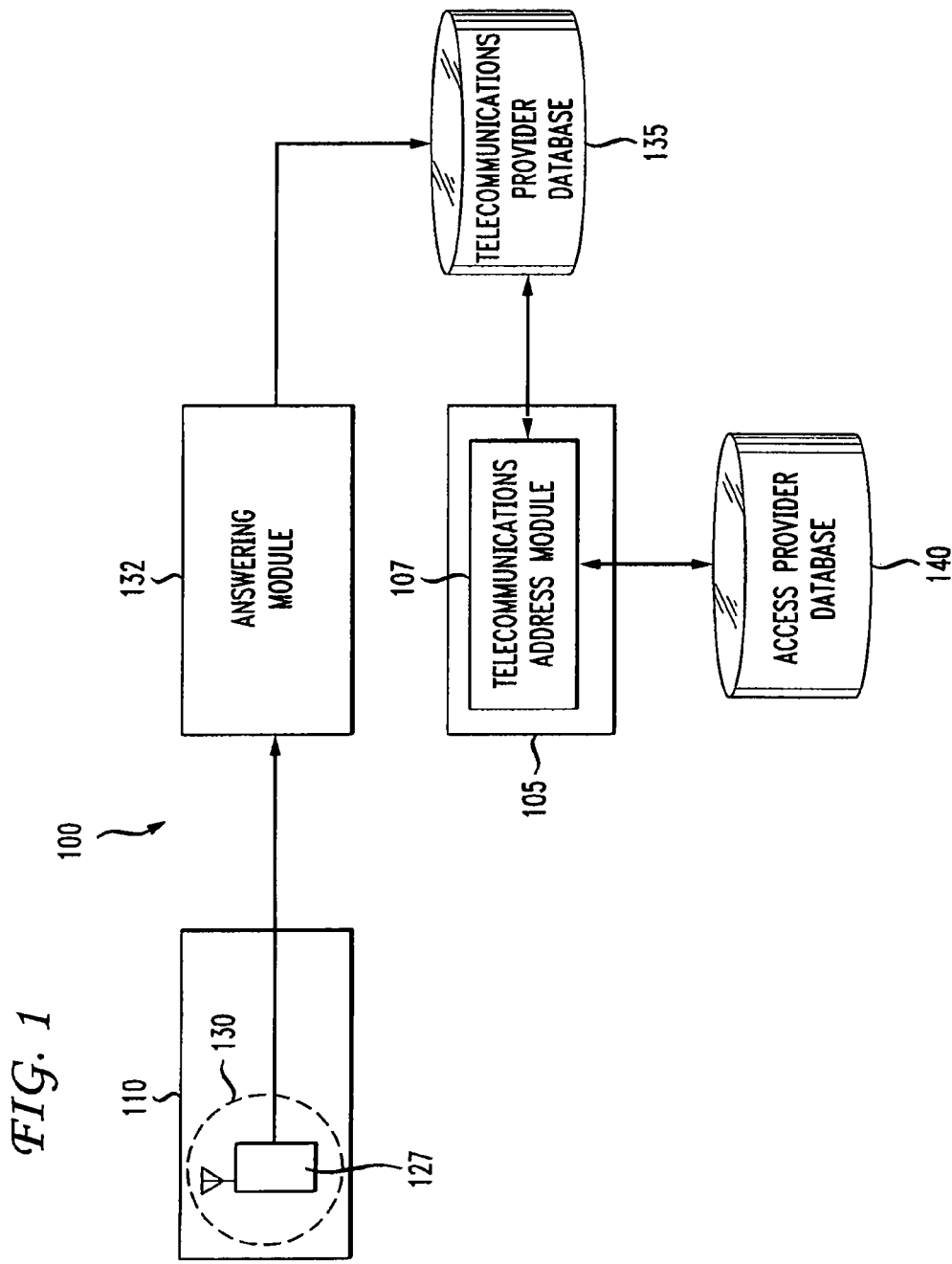
FIG. 1 is a block diagram of a telecommunications provider network including a telecommunications address module and an answering module in accordance with an embodiment of the present invention.

FIG. 1 is a block diagram of a telecommunications provider network 100 including a telecommunications provider 105. The telecommunications provider 105 includes a telecommunications address module 107 and can provide telecommunication services to a structure 110 (e.g., a building or a house). The structure 110 is located at a physical location and has a mailing address.

In accordance with an embodiment of the present invention, an End User uses a telephone 127 to call the telecommunications provider 105 and request service. A representative of the telecommunications provider 105 (or the telecommunications address module 107) asks the End User to go to (or have a person at) the desired service location 130 and place a call to a predetermined telephone number (e.g., a toll free number). The End User calls this predetermined number and an answering module 132 (e.g., of the telecommunications provider 105) receives the call. The answering module 132 obtains location data from the call (e.g., from the End User and/or from the call itself). Location data includes one of two types of location information, as described in more detail below. In one embodiment, the answering module 132 also obtains related data, such as the date, time, and originating phone number of the call.

The answering module 132 is in communication with a telecommunications provider database 135. The answering module 132 stores the location data and related data in the telecommunications provider database 135. If the telephone 127 used to place the call (to the answering module 132) is a landline telephone, then the answering module 132 stores (as location data) the caller's address (as is displayed to a 911 operator if the telephone 127 was used to place a 911 call) in the database 135. If the telephone 127 used to place the call (to the answering module 132) is a mobile telephone (e.g., a cellular telephone), then the answering module 132 stores (as location data) the Global Positioning System (GPS) coordinates (as is displayed to a 911 operator if the telephone 127 was used to place a 911 call) in the database 135.

The location of the telephone 127 that places the telephone call to the answering module 132 may be determined in a variety of manners. In one embodiment, coordinates generated by a GPS and associated with a cellular telephone's location are transmitted during the telephone call. The coordinates may accurately identify the location 130 of the caller to within a given radius, such as a three foot radius. In another embodiment, triangulation, as is well known in the art, may be performed in order to determine the location of the cellular telephone.

The telecommunications address module 107 is also in communication with the telecommunications provider database 135. The telecommunications address module 107 queries the database 135 for location data (e.g., queries the database 135 for the caller's address using the originating number and date/time (i.e., the related data) provided by the End User).

The telecommunications address module 107 uses the location data (callers address or GPS coordinates) to query Access Provider database 140. Querying the Access Provider database 140 using either the callers (911) address or GPS coordinates can result in a match with a telecommunications address stored in the Access Provider database 140. Since the End User (or someone associated with the End User) called the answering module 132 from the exact location for the desired service, the opportunity for an incorrect address is minimized. Once the correct telecommunications address is located in the Access Provider database, the telecommunications provider 105 can place the order for service with the Access Provider using the telecommunications address.

In one embodiment, End User location 130 has multiple Access Provider demarcation points. The GPS coordinates may also allow the pinpointing of the request to that level.

FIG. 2 shows an embodiment of a data structure 200 which may be stored in telecommunications provider database 135. The data structure 200 includes several columns, such as for date 205, time 210, caller number 215, call type (e.g., cellular or landline) 220, and captured location data 225. As described above, the location data 225 can be the callers address or the callers GPS coordinates.

FIG. 3 shows an embodiment of a data structure 300 which may be stored in Access Provider database 140. The Access Provider database 140 stores telecommunications addresses in one or more forms. In one embodiment, the Access Provider database 140 stores telecommunications addresses in three forms—an actual street address 305, a Common Language Location Identifier (CLLI®) code 310, and vertical (V) and horizontal (H) coordinates 315 (which are the equivalent of latitude and longitude or GPS coordinates).

A CLLI® code 310 is an identifier specifying the location and type of a piece of telecommunications equipment. The CLLI code 310 can be in a variety of formats. For example, the CLLI® code 310 may be in an eleven-character format used to describe the location of network equipment. A CLLI® code 310 is typically composed of four sub-fields:

Four characters to denote the city;

Two characters to denote the state or province;

Two characters to denote the specific location or structure address; and

Three characters to specify a particular piece of equipment.

Figure 4A:
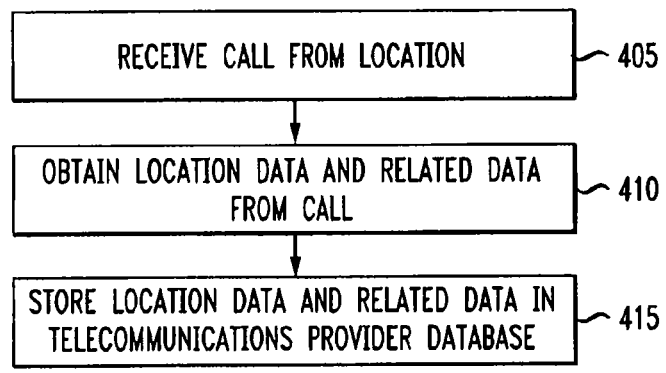
FIG. 4A is a flowchart illustrating an embodiment of the steps performed by the answering module in accordance with an embodiment of the present invention.

FIG. 4A is a flowchart illustrating the steps performed by the answering module 132. The answering module 132 (which, in one embodiment, is the telecommunications address module 107) receives a call from a location at which telecommunications services are requested in step 405. The answering module 132 obtains location data (either the caller's (911) address or GPS coordinates) and related data (e.g., date, time, and/or originating phone number of the call) from the call in step 410. The answering module 132 stores the location data and related data in the telecommunications provider database 135 in step 415.

Figure 4B:
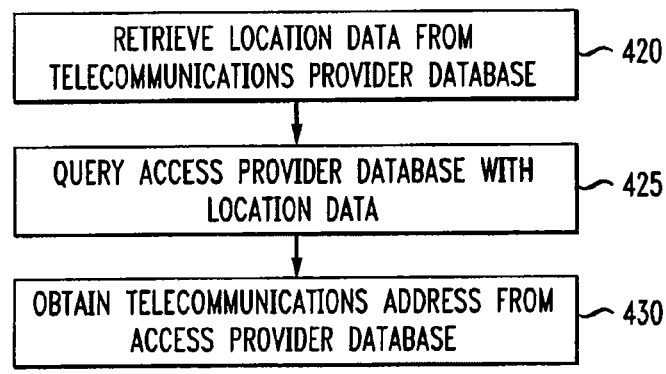
FIG. 4B is a flowchart illustrating an embodiment of the steps performed by the telecommunications address module in accordance with an embodiment of the present invention.

FIG. 4B is a flowchart illustrating the steps performed by the telecommunications address module 107. The telecommunications address module 107 retrieves the location data from the telecommunications provider database using the related data, such as the originating phone number of the call, in step 420. The telecommunications address module 107 then queries the Access Provider database 140 with the retrieved location data. The telecommunications address module 107 obtains the telecommunications address from the Access Provider database 140 in step 430.

In one embodiment, the telecommunications address (and/or location data) is made available to a third party via a service agreement. The customer may include, for example, an employer of the caller, a parent of the caller, a guardian of the caller, and a business. This would allow the third party, with the permission of the caller, to have access to the location, date, and time the call was placed.

For example, the telecommunications provider 105 may offer a service to people or businesses in which the subscribers can call a particular first telephone number and determine whether someone has called a second (e.g., toll free) telephone number, the date and/or time that they called the second telephone number, and the location at which they called the second telephone number. The second telephone number may be the same as or different than the first telephone number.

In one embodiment, an employer subscribes to this service to track one or more employees. For example, a trucking company may want to track how efficient a truck driver is in getting from one checkpoint to another checkpoint. The trucking company may subscribe to this service and then instruct the truck driver to call the predetermined (e.g., toll free) telephone number using the truck driver's cellular telephone when the truck driver reaches two checkpoints (e.g., two different truck stops along a particular highway). The truck driver calls the number each time the truck driver reaches the particular checkpoint and the service obtains location data associated with the truck driver when the truck driver placed the telephone call. In one embodiment, the location data is converted to its corresponding telecommunications address automatically. In one embodiment, this telecommunications address (and/or location data) can be plotted on a map to determine a truck driver's specific location.

The trucking company can call a telephone number (e.g., the same, predetermined telephone number or a different telephone number) and, in one embodiment, the telecommunications address may be displayed (e.g., on a computer, telephone, etc.) to the trucking company. Further, additional data may also be displayed, such as the time, date, and/or telephone number of the calls. Thus, this service may provide a way in which employers can track their employees to, for example, determine how efficient their employees are.

In another embodiment, one or more parents can subscribe to this service to track their child or children. For example, a child may be instructed to call the predetermined telephone number at a particular time to indicate where the child is located. The telecommunications address of the child can then be displayed, for example, on the parent's computer, television set, or telephone.

In yet another embodiment, a business can subscribe to this service and request that a customer call the predetermined telephone number before the business delivers its goods or services to the customer. For example, a restaurant may offer delivery of its food to its customers. The restaurant may request that customers who would like their food delivered call a predetermined telephone number. The restaurant can then obtain the telecommunications address of the customer who would like their food delivered.

In another embodiment, if a customer requests a package pick-up, the customer's address can be validated. For example, if the location data and/or telecommunications address is available immediately after the call from the customer is received, the customer calling for a taxi can place a call to a predetermined number that allows for capturing location data but also allows a representative from the business (e.g., restaurant) to talk to the customer. This allows the business (e.g., restaurant) to eliminate prank calls.

Figure 5:
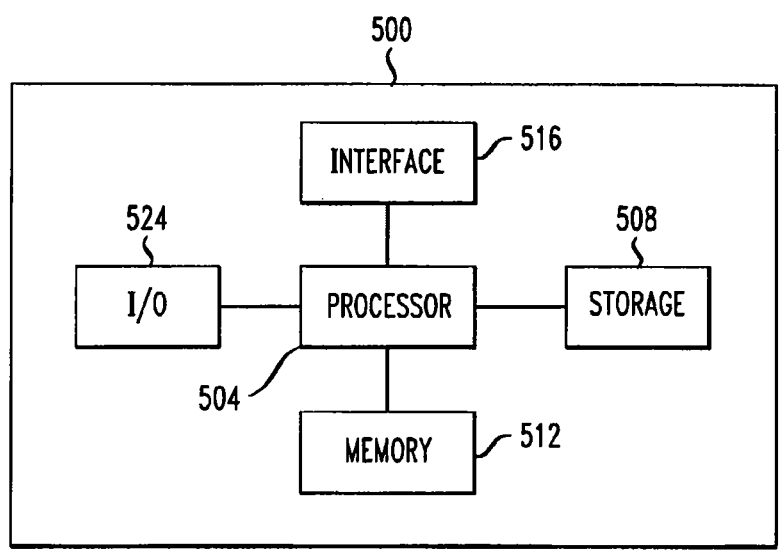
FIG. 5 is a high level block diagram of a computer in the telecommunications provider network in accordance with an embodiment of the present invention.

FIG. 5 shows a high level block diagram of a computer 500 which may be used to implement the telecommunications address module 107 and/or the answering module 132. The computer 500 can, for example, perform the steps described above (e.g., with respect to FIGS. 4A and 4B). Computer 500 contains a processor 504 which controls the overall operation of the computer by executing computer program instructions which define such operation. The computer program instructions may be stored in a storage device 508 (e.g., magnetic disk, database) and loaded into memory 512 when execution of the computer program instructions is desired. Thus, the computer operation will be defined by computer program instructions stored in memory 512 and/or storage 508 and the computer will be controlled by processor 504 executing the computer program instructions. Computer 500 also includes one or more interfaces 516 for communicating with other devices. Computer 500 also includes input/output 524 which represents devices which allow for user interaction with the computer 500 (e.g., display, keyboard, mouse, speakers, buttons, etc.). One skilled in the art will recognize that an implementation of an actual computer will contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining common language location identifier codes for a plurality of locations comprising:
   receiving a request for service from an end user;
   receiving a first telephone call from the end user located at a first location;
   instructing the end user to place a second telephone call to a telephone number;
   receiving the second telephone call from the end user located at a second location different than the first location;
   determining location data associated with the first telephone call and related data associated with the first telephone call;
   determining location data associated with the second telephone call and related data associated with the second telephone call;
   determining a common language location identifier code for the first location using the location data associated with the first telephone call and related data associated with the first telephone call;
   determining a common language location identifier code for the second location using the location data associated with the second telephone call and related data associated with the second telephone call; and
   plotting on a map the location data associated with the first telephone call and the location data associated with the second telephone call.

2. The method of claim 1, further comprising:
determining a call type of one of the first telephone call and the second telephone call is being one of a landline and cellular.

3. The method of claim 2, wherein the call type of the first telephone call is landline, the method further comprising:
storing an address associated with the location data associated with the first telephone call and related data associated with the first telephone call in a database.

4. The method of claim 2, wherein the call type of the second telephone call is cellular, the method further comprising:
determining global positioning system coordinates of the second location.

5. The method of claim 3, further comprising:
querying the database using the address to determine whether an address previously stored in the database matches the address.

6. The method of claim 5, further comprising:
in response to determining that the previous address stored in the database matches the address, placing an order for service using the address.

7. The method of claim 1 further comprising:
automatically converting the location data associated with one of the first telephone call and the second telephone call and related data associated with one of the first telephone call and the second telephone call to an address prior to the plotting on the map.

8. A non-transitory computer readable medium storing computer program instructions, which, when executed on a processor, cause the processor to perform operations comprising:
receiving a request for service from an end user;
receiving a first telephone call from the end user located at a first location;
instructing the end user to place a second telephone call to a telephone number;
receiving the second telephone call from the end user located at a second location different than the first location;
determining location data associated with the first telephone call and related data associated with the first telephone call;
determining location data associated with the second telephone call and related data associated with the second telephone call;
determining a common language location identifier code for the first location using the location data associated with the first telephone call and related data associated with the first telephone call;
determining a common language location identifier code for the second location using the location data associated with the second telephone call and related data associated with the second telephone call; and
plotting on a map the location data associated with the first telephone call and the location data associated with the second telephone call.

9. The non-transitory computer readable medium of claim 8, the operations further comprising:
determining a call type of one of the first telephone call and the second telephone call is being one of a landline and cellular.

10. The non-transitory computer readable medium of claim 9, wherein the call type of the first telephone call is landline, the operations further comprising:
storing an address associated with the location data associated with the first telephone call and related data associated with the first telephone call in a database.

11. The non-transitory computer readable medium of claim 9, wherein the call type of the second telephone call is cellular, the operations further comprising:
determining global positioning system coordinates of the second location.

12. The non-transitory computer readable medium of claim 10, the operations further comprising:
querying the database using the address to determine whether an address previously stored in the database matches the address.

13. The non-transitory computer readable medium of claim 12, the operations further comprising:
in response to determining that the previous address stored in the database matches the address, placing an order for service using the address.

14. The non-transitory computer readable medium of claim 8, the operations further comprising:
automatically converting the location data associated with one of the first telephone call and the second telephone call and related data associated with one of the first telephone call and the second telephone call to an address prior to the plotting on the map.

15. An apparatus comprising:
a memory storing computer program instructions; and
a processor communicatively coupled to the memory, the processor configured to execute the computer program instructions, which, when executed on the processor, cause the processor to perform operations comprising:
receiving a request for service from an end user;
receiving a first telephone call from the end user located at a first location;
instructing the end user to place a second telephone call to a telephone number;
receiving the second telephone call from the end user located at a second location different than the first location;
determining location data associated with the first telephone call and related data associated with the first telephone call;
determining location data associated with the second telephone call and related data associated with the second telephone call;
determining a common language location identifier code for the first location using the location data associated with the first telephone call and related data associated with the first telephone call;
determining a common language location identifier code for the second location using the location data associated with the second telephone call and related data associated with the second telephone call; and
plotting on a map the location data associated with the first telephone call and the location data associated with the second telephone call.

16. The apparatus of claim 15, the operations further comprising:
determining a call type of one of the first telephone call and the second telephone call is being one of a landline and cellular.

17. The apparatus of claim 16, wherein the call type of the first telephone call is landline, the operations further comprising:
storing an address associated with the location data associated with the first telephone call and related data associated with the first telephone call in a database.

18. The apparatus of claim 16, wherein the call type of the second telephone call is cellular, the operations further comprising:
   determining global positioning system coordinates of the second location.

19. The apparatus of claim 17, the operations further comprising:
   querying the database using the address to determine whether an address previously stored in the database matches the address.

20. The apparatus of claim 19, the operations further comprising:
   in response to determining that the previous address stored in the database matches the address, placing an order for service using the address.

* * * * *

UNITED STATES PATENT AND TRADEMARK OFFICE
CERTIFICATE OF CORRECTION

PATENT NO.        : 8,503,656 B2                                             Page 1 of 1
APPLICATION NO.   : 13/604768
DATED             : August 6, 2013
INVENTOR(S)       : Sidney Heffington It is certified that error appears in the above-identified patent and that said Letters Patent is hereby corrected as shown below:

On the Title page, at column 1, after Item (63), in the Related U.S. Application Data section, "filed on Jan. 20, 2008" should read -- filed on Jan. 2, 2008 --

Signed and Sealed this
Eleventh Day of March, 2014

Michelle K. Lee
*Deputy Director of the United States Patent and Trademark Office*